United States Patent Office 3,245,802
Patented Apr. 12, 1966

3,245,802
ANTISPATTERING MILK MARGARINE AND ITS PREPARATION
Hermann Pardun, Kleve, Germany, assignor to Lever Brothers Company, New York, N.Y., a corporation of Maine
No Drawing. Filed May 2, 1962, Ser. No. 191,741
Claims priority, application Great Britain, May 3, 1961, 15,992/61
15 Claims. (Cl. 99—123)

This invention relates to soya bean products and to margarine and provides a new kind of margarine having improved frying properties.

In margarine the aqueous phase may or may not be derived from milk. A milk-margarine contains proteins derived from the milk which improves the frying properties of the margarine in one respect in that they play a part in the formation, during frying, of a brown, very fine powder of pleasant aroma which is much valued.

It is known, with a view to imparting this browning property on frying to water-margarine to introduce proteins, for instance in the form of defatted soya flour, groundnut protein and gluten-containing wheat flour. (Defatted soya flour is made, as described by K. S. Markley in Volume II, page 956 "Soya Beans and Soya Bean Products" by dehulling soya beams, comminuting the dehulled product and forming it into flakes by passage between fluted rollers, extracting with solvent, evaporating the solvent from the extracted residue under normal or reduced pressure and at the same time removing bitter-flavour constituents and finally cooling the residue in an air stream, drying it and reducing it to a fine powder.)

Another frying property which is much desired in margarine is the ability to lose its water during frying without spattering. In a water-margarine this property can be imparted to some degree by incorporating lecithin. The addition of lecithin to a milk-margarine, on the other hand, does not greatly reduce its tendency to spatter, apparently owing to some interaction between the lecithin and the milk protein. Reduction of the tendency of milk-margarine to spatter has, in consequence, presented a problem to which many solutions, none altogether satisfactory, have been proposed.

It has now been found, contrary to expectation, that the tendency of milk-margarine to spatter can be greatly reduced by incorporating small proportions (for instance 0.1 to 1.5% based on the weight of fat) of debittered finely devided soya bean material (referred to below as "debittered soya bean flour"), in which the protein is not denatured to a substantial extent. Especially good results are obtained when the soya bean flour is substantially free from oil. The addition of this soya bean material is effective even when the margarine has been de-aerated so as to contain less 5% of even less than 0.5% of its volume of air, which increases its tendency to spatter.

The present invention, therefore comprises milk-margarine having a reduced or negligible tendency to spatter in frying owing to the presence therein of a small proportion (preferably 0.2 to 1% of the weight of the fat) of the said soya bean flour, and the manufacture of such margarines by incorporating the soya bean flour at a suitable stage of manufacture.

In the preferred method of making the soya bean flour, soya beans of good quality are debittered by mildly heating the beans with hot water, steam or other gases in the presence of moisture, during which treatment alkaline or acid reacting compounds may be present.

Next the soya beams are dehulled, ground and dried. The activity of the additive is improved if the debittered soya beans before or after the grinding, are extracted with fat solvents, for example low boiling hydrocarbons, alcohols and ketones.

The additives obtained can be added, during the margarine preparation, to the aqueous phase, the fat-phase or to the emulsion itself. Preferably they are added to an aqueous liquid which is to form the aqueous phase, or part thereof, the pH of that liquid being adjusted if necessary to within the range 4.5 to 5. The additives are preferably used in conjunction with emulsifiers such as lecithin and mono- and di-glycerides. Generally the additive is suspended in a part of the water-phase and the suspension obtained is pasteurised after the pH is adjusted to the desired value.

It has been proposed in British Patent No. 614,593 to add to margarine 0.1 to 1% by weight of a composition containing a vegetable phosphatide together with 0.1 to 1% of its weight of soluble soya protein. Such compositions are very different in constituting from the soya bean flours used in the present invention, especially in that the amount of vegetable protein they contain is very small. As will be shown below they are much less effective as anti-spattering agents for milk-margarine than the said soya bean flours.

The following Examples 1 to 3 illustrate the preparation of soya bean flour for use in the invention.

Active soya preparations were obtained according to the following methods:

EXAMPLE 1

Washed soya beans with a water content of 8.5% were steamed during 20 minutes at 100° C.; after this treatment the water content of the beans was 10.5%. Thereafter the beans were dried in vacuum at 65° C. to the original water content and ground to pass a sieve of 50 meshes/cm.

EXAMPLE 2

Soya beans were treated as described in Example 1. The powder obtained was thereafter extracted with 96% concentrated alcohol till it was substantially free from oil and again dried.

EXAMPLE 3

Soya beans were treated according to Example 1. The powder obtained was extracted with technical hexane until the oil-content of the product was lower than 1%.

EXAMPLES 4 TO 6

These examples illustrate the preparation of margarine according to the invention.

Samples of de-aerated margarine were prepared containing different proportions ranging from 0.2 to 1.2% by weight of the fat-content, of different soya bean flours. The soya bean flours used in Examples 4 to 6 were made according to Examples 1 to 3 respectively. The soya bean flour was suspended in the water phase, which was adjusted to a pH value of 4.5 with citric acid. The fatty phase of the margarine had the following composition:

25% of cottonseed oil
40% of coconut oil
25% of hardened cottonseed oil (M.P. 32°–34° C.)
5% of palm oil
5% of hardened palm oil (M.P. 40°–42° C.)

All the margarines contained 50 g. of acidified milk, 2 g. of monodiglyceride, 2 g. of lecithin per 1,000 g. fat and had a water content of 19.8%.

All samples were completely de-aerated. The resulting margarines were tested 24 hours after the soya bean flour was added to the aqueous phase during their preparation, as described below.

A pan with a diameter of 18 cm. was pre-heated to 200° C. A sheet of filter-paper was fixed horizontally 20 cm. above the bottom of the pan. 50 g. of margarine was put into the pan and heated until the evaporation of water had ceased. Spattered fat was caught by the filter-paper, forming more or less coherent fat spots on it. The extent of these fat spots is a measure of the spattering. The anti-spattering property of the margarines of these examples as shown by the test referred to and of a similar margarine made with egg yolk in place of the soya bean flour is indicated in Table I below by ratings having the following significance:

10=excellent
8=good
6=sufficient
4=insufficient
2=very bad

*Table I*

| Nature of additive | Proportion of additive (g./1,000 g. of fat) | | | | |
|---|---|---|---|---|---|
| | 0 | 2 | 4 | 8 | 12 |
| | Anti-spattering rating | | | | |
| Egg yolk | 1 | 1 | 2 | 4 | 5 |
| Product of Example 1 | 1 | 4 | 5 | 7 | 9 |
| Product of Example 2 | 1 | 10 | 10 | 10 | 10 |
| Product of Example 3 | 1 | 10 | 10 | 10 | 10 |

Table II below shows the results of applying the test described above to margarines containing:
A. The composition of British Patent No. 614,593, Example VI, No. 4 in the proportions specified in the first column of the table;
B. Soya lecithin in the proportions specified in the first column;
C. Soya bean flour in the proportions specified in the first column plus 2 g./1000 g. of fat of lecithin.

The margarines were all made from the fat blend used in Examples 4 to 6 and contained per 1000 g. of fat, 50 g. of acidified milk and 2 g. of mono-diglyceride. The water content was 19.8% and the margarines were de-aerated.

*Table II*

| Additive in g./1,000 g. of fat | A | B | C |
|---|---|---|---|
| 0 | 1 | 1 | 1 |
| 1 | 1 | 3 | 9 |
| 2 | 1 | 4 | 10 |
| 4 | | | 10 |
| 5 | 7 | 6 | |

These results illustrate the considerable advantage obtained by the use of the soya bean flour plus lecithin over both lecithin alone and the compositions of the patent referred to, even when the last two are used in relatively high proportions.

Similar inferior results were obtained in trials with the sodium globulinates which are mentioned in the British patent.

What is claimed is:

1. A milk margarine having a reduced tendency to spatter in frying due to the presence therein of 0.1 to 1.5% based on the weight of margarine fat of a hydrothermally debittered soya bean flour in which the protein is not denatured to a substantial extent.

2. A margarine according to claim 1, wherein the flour is substantially free from oil.

3. A process for preparing a milk margarine of reduced tendency to spatter which comprises forming an aqueous mixture, containing acidified milk, suitable for providing at least part of the aqueous phase of the margarine, said mixture being of pH 4.5 to 5, the aqueous mixture having suspended therein a hydrothermally debittered soya bean flour in which the protein is not denatured to a substantial extent, and preparing a margarine in which the said aqueous mixture constitutes at least part of the aqueous phase thereof, the said flour being present in the margarine at a level of from 0.1 to 1.5% by weight of the margarine fat.

4. A process according to claim 3, wherein the margarine contains less than 5% of its volume of air.

5. A process according to claim 3, wherein the margarine contains a small proportion of lecithin and of a mono-diglyceride.

6. A process according to claim 3, wherein the debittered soya bean flour is prepared by debittering soya beans with a hot aqueous medium, dehulling and grinding the debittered soya beans to a powder and drying.

7. A process according to claim 3, wherein the debittered soya bean flour is prepared by debittering soya beans with a hot aqueous medium, dehulling the debittered soya beans, extracting the debittered soya beans with a solvent for fat, grinding the debittered soya beans and drying the powder thus obtained.

8. A process according to claim 3, wherein the debittered soya bean flour is prepared by debittering soya beans with a hot aqueous medium, dehulling and grinding the debittered soya beans to a powder, extracting the powder with a solvent for fat and drying.

9. A process according to claim 3, wherein the debittered soya bean flour is prepared by debittering soya beans with a hot aqueous medium, dehulling and grinding the debittered soya beans to a powder, extracting the powder with ethanol and drying.

10. A process according to claim 3, wherein the debittered soya bean flour is prepared by debittering soya beans with a hot aqueous medium, dehulling and grinding the debittered soya beans to a powder, extracting the powder with a low-boiling hydrocarbon and drying.

11. A milk margarine containing lecithin as an emulsifier, said margarine having a reduced tendency to spatter in frying due to the presence therein of 0.1 to 1.5% based on the weight of margarine fat of a hydrothermally debittered soya bean flour in which the protein is not denatured to a substantial extent.

12. A milk margarine containing a mono-digylceride as an emulsifier, said margarine having a reduced tendency to spatter in frying due to the presence therein of 0.1 to 1.5% based on the weight of margarine fat of a hydrothermally debittered soya bean flour in which the protein is not denatured to a substantial extent.

13. A milk margarine containing both lecithin and a mono-diglyceride as emulsifiers, said margarine having a reduced tendency to spatter in frying due to the presence therein of 0.1 to 1.5% based on the weight of margarine fat of a hydrothermally debittered soya bean flour in which the protein is not denatured to a substantial extent.

14. A de-aerated milk margarine having a reduced tendency to spatter in frying due to the presence therein of 0.1 to 1.5% based on the weight of fat of a hydrothermally debittered soya bean flour in which the protein is not denatured to a substantial extent.

15. A de-aerated milk margarine containing both lecithin and a mono-diglyceride as emulsifiers, said margarine having a reduced tendency to spatter in frying due to the presence therein of 0.1 to 1.5% based on the weight of fat of a debittered soya bean flour in which the protein is not denatured to a substantial extent.

References Cited by the Examiner

UNITED STATES PATENTS 2,724,649  11/1955  Julian et al. _____ 99—123

FOREIGN PATENTS 614,593  12/1948  Great Britain.
521,394  5/1940  Great Britain.

OTHER REFERENCES

Markley, Soybeans and Soybean Products, vol. II, p. 956, 1951, Interscience Publ., Inc., N.Y.; SB205.S7M345.

A. LOUIS MONACELL, *Primary Examiner.*

ABRAHAM H. WINKELSTEIN, *Examiner.*